(12) United States Patent
Peng et al.

(10) Patent No.: US 8,371,805 B2
(45) Date of Patent: Feb. 12, 2013

(54) FIXING APPARATUS FOR FAN

(75) Inventors: Wen-Tang Peng, Taipei Hsien (TW);
Xin-Hu Gong, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 610 days.

(21) Appl. No.: 12/630,766

(22) Filed: Dec. 3, 2009

(65) Prior Publication Data

US 2011/0070080 A1 Mar. 24, 2011

(30) Foreign Application Priority Data

Sep. 21, 2009 (CN) .......................... 2009 1 0307366

(51) Int. Cl.
*F01D 5/10* (2006.01)
(52) U.S. Cl. .................. 415/119; 415/213.1; 415/214.1; 415/220; 415/223
(58) Field of Classification Search .................. 415/119, 415/213.1, 214.1, 220, 223
See application file for complete search history.

(56) References Cited

U.S. PATENT DOCUMENTS

| | | | | |
|---|---|---|---|---|
| 5,186,605 | A | * | 2/1993 | Tracy .......................... 415/213.1 |
| 5,208,730 | A | * | 5/1993 | Tracy ............................. 415/119 |
| 6,556,437 | B1 | * | 4/2003 | Hardin ........................ 415/213.1 |
| 7,306,425 | B2 | * | 12/2007 | Park et al. ...................... 415/119 |
| 7,450,379 | B2 | * | 11/2008 | Chen et al. .................. 415/213.1 |
| 2007/0237625 | A1 | * | 10/2007 | Liang ............................. 415/119 |
| 2008/0137293 | A1 | * | 6/2008 | Yang ............................. 361/695 |

FOREIGN PATENT DOCUMENTS

CN 201027711 Y 2/2008

* cited by examiner

*Primary Examiner* — Igor Kershteyn
(74) *Attorney, Agent, or Firm* — Altis Law Group, Inc.

(57) ABSTRACT

A fixing apparatus includes two receiving boxes, and a plurality of elastic members. The receiving boxes are covered to each other, to receive a fan. The plurality of elastic members is correspondingly fixed to the receiving boxes, to support the fan and separate the fan from the receiving boxes. When the fan operates, the plurality of elastic members absorbs vibration produced by the fan, and protects the fan from vibrating against the receiving boxes.

10 Claims, 3 Drawing Sheets

FIXING APPARATUS FOR FAN

BACKGROUND

1. Technical Field

The present disclosure relates to a fixing apparatus for a fan.

2. Description of Related Art

An electronic device, such as a computer or a server, generally includes a fan for dissipating heat for the electronic device. To meet the need of higher heat dissipating efficiency, the fan must rotate faster, which will cause more noise and greater vibration.

DETAILED DESCRIPTION

Figure 1:
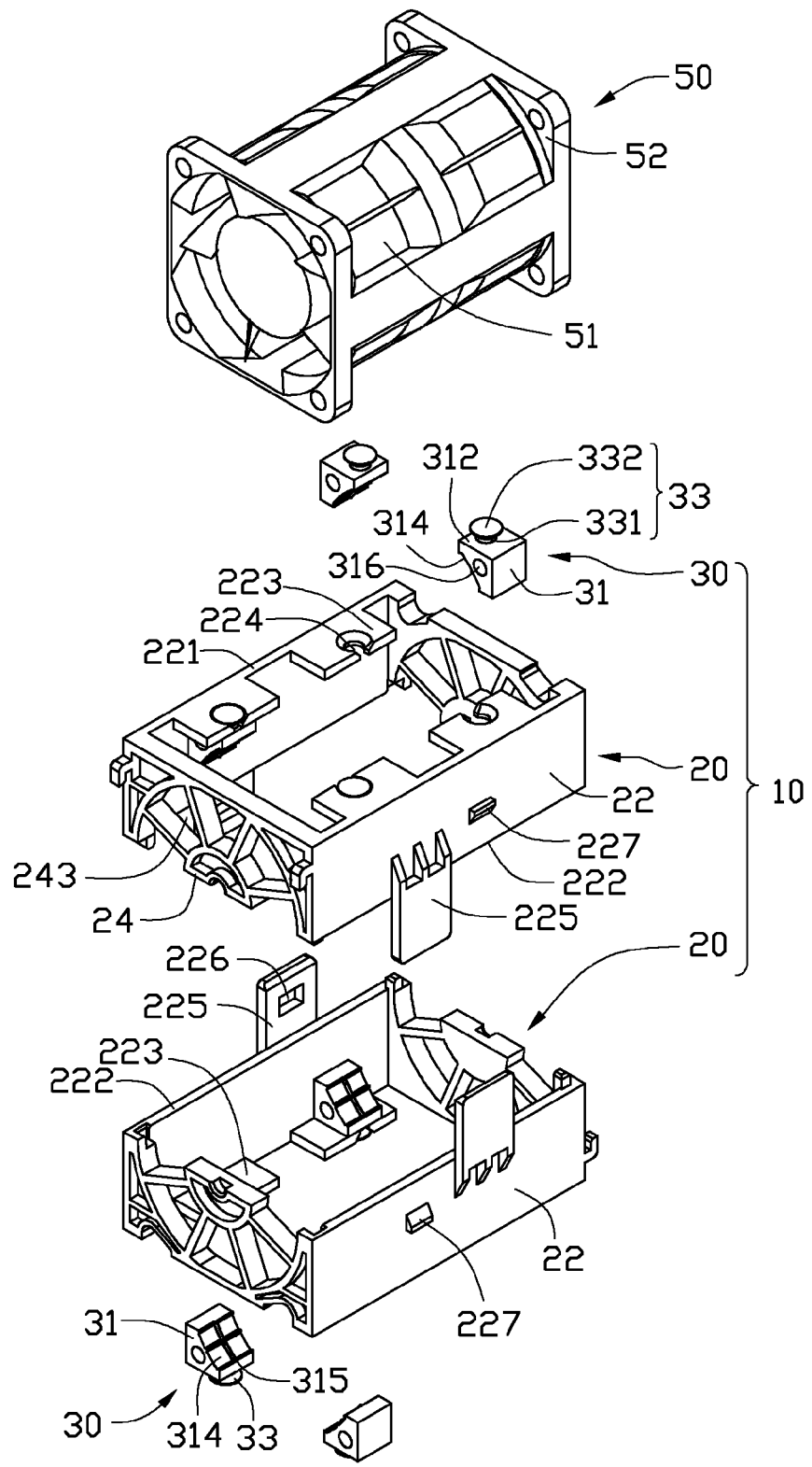
FIG. 1 is an exploded, isometric view of an embodiment of a fixing apparatus together with a fan.

Referring to FIG. 1, an embodiment of a fixing apparatus 10 is provided for fixing a fan 50 in an electronic device. The fixing apparatus 10 includes two receiving boxes 20 and a plurality of elastic members 30.

The fan 50 includes a substantially columnar main body 51, and two end portions 52 correspondingly arranged at opposite ends of the main body 51.

Each receiving box 20 includes two opposite sidewalls 22, and two opposite end walls 24 connected perpendicularly between the sidewalls 22. Each end wall 24 defines a plurality of vents 243. Each sidewall 22 includes a first edge 221, and a second edge 222 opposite to the first edge 221. Two spaced fixing plates 223 extend perpendicularly from an inner surface of each sidewall 22 adjoining the first edge 221. Each fixing plate 223 defines a C-shaped notch 224 in a side of the fixing plate 223 away from the connected sidewall 22, with an opening of the notch 224 towards the opposite sidewall 22. A size of each notch 224 is gradually diminished along a direction from the first edge 221 to the second edge 222 of the corresponding sidewall 22. An elongated latch 225 extends from an outer surface of each sidewall 22 towards a direction away from the first edge 221. A first latching portion 226 is formed on an inner side of each latch 225. A second latching portion 227 is formed on the outer surface of each sidewall 22. In this embodiment, the first latching portions 226 are latching slots, and the second latching portions 227 are protrusions. In another embodiment, the first latching portion 226 may be protrusions, and the second latching portions 227 may be latching slots.

Each elastic member 30 is made of rubber or rubber-like material, and includes a substantially cube-shaped main block 31, and a fixing portion 33 extending perpendicularly from a first side 312 of the main block 31. A slanted contacting surface 314 is formed on each main block 31, by cutting a rim of the main block 31 from a side perpendicular to the first side 312 to another side opposite to the first side 312. Each contacting surface 314 is curved to match an exterior surface of the main body 51 of the fan 50. A plurality of flanges 315 is formed on each contacting surface 314 to increase friction between the contacting surface 314 and the fan 50. A through hole 316 is defined in a middle of each main block 31 to increase elastic coefficient of the main block 31.

The fixing portion 33 has a substantially T-shaped cross section, and includes a columnar neck 331 extending from the first side 312 of the main block 31, and a generally taper-shaped head 332 extending from a distal end of the neck 331 away from the main block 31. A diameter of the head 332 gradually grows larger along a direction away from the corresponding main block 31. A curved surface is formed on a distal end of the head 332 away from the neck 331.

Figure 2:
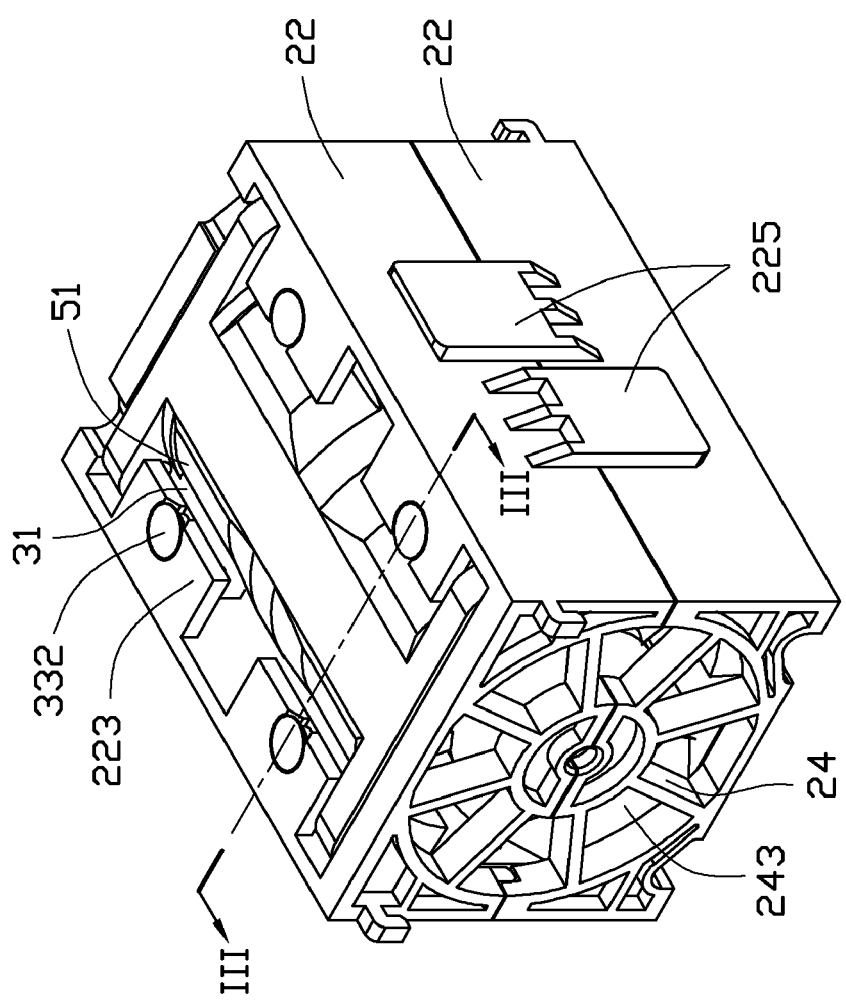
FIG. 2 is an assembled, isometric view of the fixing apparatus and the fan of FIG. 1.
Figure 3:
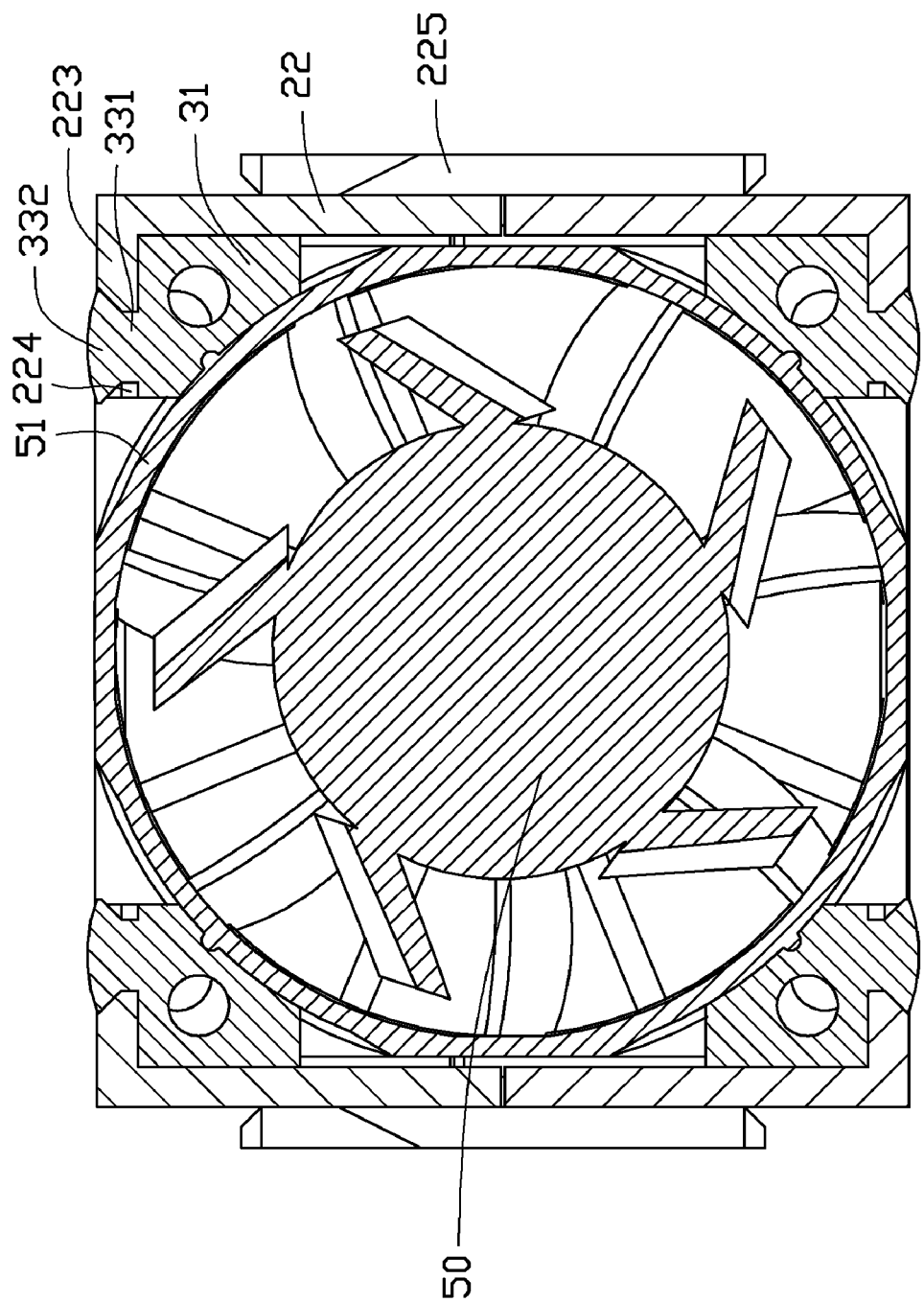
FIG. 3 is a cross-sectional view taken along the line III-III of the fixing apparatus and the fan of FIG. 2.

Referring to FIGS. 2 and 3, in assembly, the plurality of elastic members 30 is correspondingly fixed in the receiving boxes 20, by squeezing the neck 331 of each elastic member 30 to enter the notch 224 of a corresponding fixing plate 223 through the opening of the notch 224, allowing the contacting surface 314 of each elastic member 30 to face a middle of the corresponding receiving box 20. The first side 312 and another side opposite to the contacting surface 314 of each elastic member 30 engage with the corresponding fixing plate 223 and a corresponding sidewall 22 connected to the fixing plate 223, respectively. The curved surface of the head 332 of each elastic member 30 is exposed out of the corresponding fixing plate 223, through the corresponding notch 224. Thereby, the plurality of elastic members 30 are correspondingly fixed to the plurality of fixing plates 223. The fan 50 is placed in one of the receiving boxes 20, with the end portions 52 of the fan 50 correspondingly engaging with the end walls 24 of the receiving box 20, and the main body 51 of the fan 50 engaging with the contacting surfaces 314 of the elastic members 30 in the receiving box 20. The other one of the receiving boxes 20 is inverted and reversed, and then is placed to cover the receiving box 20 receiving the fan 50. The first latching portions 226 of the latches 225 of each receiving box 20 correspondingly engage with the second latching portions 227 of the opposite receiving box 20. Thereby, the fan 50 is entirely received in the receiving boxes 20. The main body 51 of the fan 50 is supported by the contacting surfaces 314 of the plurality of elastic members 30 in the receiving boxes 20, and separated from the receiving boxes 20 by the plurality of elastic members 30. The plurality of elastic members 30 surrounds the fan 50, and provides centripetal elastic forces to the fan 50, to ensure the fan 50 is firmly fixed in place.

When the fan 50 operates, the plurality of elastic members 30 absorbs vibration produced by the fan 50, and protects the fan 50 from vibrating against the receiving boxes 20. The curved surfaces of the heads 332 of the plurality of elastic members 30 exposed out of the plurality of fixing plates 223 will isolate the receiving boxes 20 from other structures in the electronic device, and protect the fan 50 and the receiving boxes 20 from vibration.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A fixing apparatus for a fan, comprising:
   first and second receiving boxes connected to each other to bound a receiving space to receive the fan, each of the first and second receiving boxes comprising two opposite sidewalls, wherein an outer surface of each sidewall of the first receiving box forms a latch, each latch forms a first latching portion, and an outer surface of each sidewall of the second receiving box forms a second latching portion, to engage with a corresponding first latching portion of the first receiving box; and a plurality of elastic members correspondingly fixed in the first and second receiving boxes to support the fan and separate the fan from the receiving boxes, wherein each of the plurality of elastic members comprises a slanted contacting surface to engage with the fan, each of the first and second receiving boxes comprises a side opposite to the other one of the first and second receiving boxes, the side of each of the first and second receiving boxes forms two pairs of fixing plates, the pairs of fixing plates are correspondingly connected to inner surfaces of the sidewalls of the corresponding receiving box, and the plurality of elastic members are correspondingly fixed to the fixing plates of the first and second receiving boxes.

2. The fixing apparatus of claim 1, wherein each of the plurality of elastic members is made of rubber material.

3. The fixing apparatus of claim 1, wherein each elastic member comprises a main block entering into the receiving space, and two adjacent sides of the main block engage with a corresponding fixing plate and a corresponding sidewall, respectively.

4. The fixing apparatus of claim 3, wherein the contacting surface of each elastic member is formed on the corresponding main block opposite to the two adjacent sides.

5. The fixing apparatus of claim 4, wherein the contacting surface of each elastic member is curved, to match an exterior surface of the fan, and a plurality of flanges is formed on each contacting surface, to increase friction between the contacting surface and the fan.

6. The fixing apparatus of claim 3, wherein a through hole is defined in a middle of the main block of each elastic member, to increase elastic coefficient of the main block.

7. The fixing apparatus of claim 3, wherein each fixing plate defines a C-shaped notch in an end of the fixing plate away from a corresponding connected sidewall, with an opening of the notch opposite to the connected sidewall, a size of each notch is gradually diminished along a direction towards inside of the corresponding receiving box, each elastic member further comprises a fixing portion, each fixing portion comprises a neck extending from the main block to engage in a corresponding notch through the opening, and a head extending from a distal end of the neck away from the main block, a diameter of the head gradually grows larger along an extending direction of the head, the head and the main body is opposite to each other across the corresponding fixing plate, to prevent the elastic member from disengaging from the notch.

8. The fixing apparatus of claim 7, wherein a distal end of each head away from the corresponding neck is exposed through the corresponding fixing plate.

9. The fixing apparatus of claim 1, wherein the first latching portions are latching slots correspondingly defined in inner surfaces of the latches, and the second latching portions are protrusions.

10. The fixing apparatus of claim 1, wherein each receiving box further comprises two opposite end walls connected perpendicularly between the sidewalls, to engage with opposite ends of the fan respectively, each of the end walls defines a plurality of vents.

* * * * *